United States Patent [19]

Hampson

[11] Patent Number: 4,745,512

[45] Date of Patent: May 17, 1988

[54] REMOTE PROTECTION OF THREE PHASE DISTRIBUTION TRANSFORMERS

[75] Inventor: John T. Hampson, Chester, United Kingdom

[73] Assignee: The Electricity Council, London, United Kingdom

[21] Appl. No.: 98,007

[22] Filed: Sep. 17, 1987

[30] Foreign Application Priority Data

Sep. 30, 1986 [GB] United Kingdom ............... 8623467

[51] Int. Cl.[4] ........................................... H02H 7/045
[52] U.S. Cl. ....................................... 361/36; 361/65; 361/76; 361/80; 361/83; 361/85; 364/483
[58] Field of Search ...................... 361/35, 36, 65, 76, 361/79, 80, 83, 85, 86, 87; 340/658, 660, 664; 364/483; 324/500, 521, 522

[56] References Cited

U.S. PATENT DOCUMENTS 4,261,038 4/1981 Johns et al. ..................... 361/79 X
4,293,886 10/1981 Church et al. ................... 361/76 X
4,405,966 9/1983 Cavero .............................. 361/85 X
4,408,246 10/1983 Roy .................................... 361/85 X
4,541,058 9/1985 Andow et al. ................... 361/79 X
4,669,024 5/1987 Stacey ................................. 361/85
4,686,601 8/1987 Alexander et al. ............. 361/76 X Primary Examiner—A. D. Pellinen
Assistant Examiner—Derek S. Jennings
Attorney, Agent, or Firm—Welsh & Katz, Ltd.

[57] ABSTRACT

It is desirable to provide remote digital protection of distribution transformers. This specification discloses a protection system able to measure and compare increases in both negative and positive phase reference currents on a distribution cable feeding a transformer and to trigger a circuit breaker to isolate the cable only if the negative sequence current increase exceeds a predetermined proportion of any simultaneous positive sequence current increase. Consequently, engergizing with a 12.5% unbalance current has been found possible without false tripping.

26 Claims, 6 Drawing Sheets

REMOTE PROTECTION OF THREE PHASE DISTRIBUTION TRANSFORMERS

FIELD OF THE INVENTION

The present invention relates to the remote protection of three phase electricity supply distribution transformers.

DESCRIPTION OF THE PRIOR ART

In a typical supply network, electricity supply is fed from a primary sub station over a distributor cable to several local sub stations at which the supply is transformed by distribution transformers from a relatively high voltage on the distributor cable to the lower voltage at which it is supplied to the domestic consumer. Typically the distributor cable operates at 11 kV in the United Kingdom and the distribution transformers convert this to 415/24OV for direct use by customers. It is a required practice that suitable protection is provided for the distribution transformers at these local sub stations to ensure that the transformer is de-energised in the event of a fault arising. Hitherto, this has been done principally by providing local protection and disconnection devices at the distribution transformer using over current devices, e.g. inverse time relays and current breakers or high voltage switch fuses.

At the primary sub station it is has been normal to provide only circuit breaker protection to de-energise the entire distributor cable in the event of substantial and sustained over current in the cable. This circuit breaker protection at the primary sub station is quite inadequate to provide protection of remote distribution transformers since the fault current arising from a distribution transformer fault might be inadequate to trip the main circuit breaker at the primary sub station.

Nevertheless, it has been proposed to provide more sensitive fault detection devices at the primary sub station with a view to reducing the level of fault protection which must be installed at the local sub station. However, hitherto protection devices fitted at primary sub stations have been insufficiently sensitive to provide adequate protection of distribution transformers located at remote sub stations.

Reference should now be made to the following three articles by J. T. Hampson which appeared in Distribution Developments:

"Digital Protection" in the issue of June 1983, pages 6 to 8;

"New Thinking on HV Radial Protection", in the issue of September 1983, pages 14 to 16; and "Transformer Protection and Control using Digital Techniques", in the issue of December 1983, pages 11 to 13.

These articles discuss and disclose a possible solution to the provision of adequate remote distribution transformer protection by a device located at a primary sub station. The articles propose the use of digital sampling of voltage and current on all three phases of the distributor cable at the primary sub station, digital filtering of these samples by Fourier analysis techniques to eliminate harmonic content, and then monitoring the filtered values for relatively sudden increments which might be indicative of a fault. Both Positive Sequence Protection and Negative Sequence Protection is disclosed in the second of the two articles. For the Positive Sequence Protection it is proposed to derive values for the circuit admittance from the filtered values for positive sequence voltage and current, and to monitor the circuit admittance for changes which might be indicative of a fault. It is also suggested that it should be possible to achieve increased sensitivity to incremental admittance changes involving large lagging power factors. It is proposed that a Microprocessor Protection Relay is programmed to take account of power factor by relating it to sensitivity so that sensitivity is in effect mapped against phase angle.

For Negative Sequence Protection, the article proposes an "Incremental Voltage-Restraint Over Current Characteristic" for the purpose of providing sufficient sensitivity to negative sequence current caused by imbalance faults on the load side of the primary sub station. If effect, the setting at which a detected negative sequence current increment is considered to be indicative of a distributor fault is increased in accordance with the simultaneously detected level of negative sequence voltage increment. The higher the detected negative sequence voltage increment, the higher must be the detected negative sequence current increment to be considered indicative of a fault.

The above mentioned second article finishes by identifying various problems with the proposals set out in the article, particularly problems arising when a heavily loaded distributor circuit is first energised. The proposals outlined in the article could give rise to false operation of the circuit breaker on energising a circuit which is in fact healthy. The disclosed device is also excessively sensitive to any substantial load switching on the distributor cable which might cause false operation of the circuit breaker. In particular, the disclosed device can be sensitive to the magnetising inrush current on first energising a distribution transformer.

STATEMENT OF THE INVENTION

The present invention is particularly concerned with important developments of the digital protection proposal outlined in the above three articles which provide substantial improvement in performance.

According to one aspect of the present invention, a method of remotely protecting three phase electricity supply distribution transformers includes the steps of monitoring parameters of the supply on a distributor cable to the transformers to detect both increases in negative sequence current and increases in positive sequence current, comparing detected simultaneous increases in negative and positive sequence currents and initiating the triggering of a circuit breaker to isolate the supply cable in response to a detected increase in negative sequence current only if the negative sequence current increase exceeds a predetermined proportion of any simultaneous positive sequence current increase.

In this way, a detected negative sequence current increment will only give rise to triggering of the circuit breaker if it is more than the predetermined proportion of the detected positive sequence current increment. In this way, the method permits, in one example, the energising of a loaded distributor cable with up to 12.5% unbalance current flow without the risk of causing false tripping of the protection circuit breaker. In normal operation, with a fully energised distributor cable, a suddenly arising negative sequence current increment which is associated with an unbalanced fault is not usually associated with a much larger simultaneous rise in positive sequence current, so actual faults in distribution transformers can be detected with high sensitivity.

Preferably, the circuit breaker is triggered only if the negative sequence current increase exceeds a predetermined minimum threshold increase plus said predetermined proportion of any simultaneous positive sequence current increase. Said predetermined proportion is normally selected to be greater than the maximum expected proportion of negative sequence to positive sequence current during energising of a fault free distributor cable with connected load.

Preferably also, supply parameters are monitored also to detect increases in negative sequence voltage and the circuit breaker is triggered only if the negative sequence current increase exceeds a predetermined factor times any simultaneous negative sequence voltage increase plus said predetermined minimum threshold increase plus said predetermined proportion of any simultaneous positive sequence current increase. In this way, the negative sequence protection is also rendered insensitive to negative sequence current flowing into the load from unbalance disturbances on the source side of the circuit breaker. Said predetermined factor is normally selected to be greater than the modulus of the admittance of the distributor cable and connected load.

According to a further aspect of the present invention, a method of remotely protecting three phase electricity supply distribution transformers includes the steps of measuring parameters of the supply in a distribution cable to the transformers to provide time related values for the positive sequence current, voltage and phase angle, calculating therefrom time related values for the susceptance of the distributor cable and load connected thereto, monitoring said time related susceptance values to detect increases in negative susceptance, and triggering a circuit breaker to isolate the supply cable if said increase exceeds a predetermined threshold increase.

By monitoring the susceptance of the distributor cable and connected load, the positive sequence monitoring at the primary sub station is rendered relatively insensitive to changes in positive sequence current arising from the energising of substantial new load. Fault free load on the great majority of distributors can be expected to have a power factor at or near zero degrees. The connection of fault free load to an energised distributor cable should not give rise to a significant change in the detected susceptance of the cable and load. On the other hand, fault current flowing in the distributor cable owing to a fault in a distribution transformer is almost invariably associated with a substantial lagging power factor so that a sudden increase in positive sequence current resulting from a fault will show a substantial increase in the detected negative susceptance.

It should be appreciated that the above referred method involving detecting increases in negative susceptance can additionally be employed in combination with the previously described method so as to give both negative sequence and positive sequence protection.

Conveniently, the time related susceptance values are calculated using the measured values for positive sequence phase angle biased by a predetermined compensation angle selected to produce zero monitored susceptance increase for normal fault free increases in load current. A typical bias angle may be 15°.

In accordance with a yet further aspect of the present invention, a method of remotely protecting three phase electricity supply distribution transformers comprises the steps of monitoring parameters of the supply in a distributor cable to the transformers to detect increases in positive sequence current and to detect increases in negative sequence current resulting from unbalanced disturbances on the cable, and initiating the triggering of a circuit breaker to isolate the supply cable in response to a detected increase in negative sequence current only if there is a simultaneous detected increase in the positive sequence current in excess of a respective threshold increase. This aspect of the invention provides an arrangement for increasing the ability of a fault detection process to discriminate against increases in negative sequence current resulting from unbalanced disturbances on the distributor associated with disconnection of unbalanced loads. Disconnection of unbalanced loads, especially as a result of operation of protective devices on the lower voltage network, such as fuses, can result in substantial increases in negative sequence current, but would normally give rise to a simultaneous decrease in the positive sequence current.

It should be appreciated that the method of the above described further aspect of the invention may be employed in combination with the methods of any of the previously described aspects. In particular, when employing the method of positive sequence detection by monitoring increases in negative susceptance, as described above, triggering of the circuit breaker may be inhibited unless an increase in the positive sequence current in excess of the threshold is detected simultaneously with the detected increase in negative susceptance.

In yet a further aspect of the present invention, a method of remotely protecting three phase electricity supply distribution transformers comprises the steps of monitoring parameters of the supply in a distributor cable to the transformers to detect increases in transient D.C. current flowing in the respective phases, and also to detect increases in other selected functions of said parameters for identifying and quantifying a fault current flowing in the distributor cable, analysing increases in said other selected functions to identify whether said increases indicate a fault current and to quantify any such fault current and initiating the triggering of a circuit breaker to isolate the supply cable on identifying a fault current, wherein said circuit breaker is not triggered for any increases in said other selected functions for as long as there is a detected increase in D.C. current in any phase. This aspect of the invention provides a degree of immunity for the protection method to false operation of the circuit breaker in response to detected increases resulting from the magnetising inrush current when a distribution transformer is being energised or a transient D.C. current due to asymmetrical switching operations. Such magnetising inrush current typically includes a significant D.C. component so that a D.C. increment is detected when the distribution transformer is first energised. The method of this aspect of the invention effectively inhibits the other fault current detection arrangements during the course of a simultaneous D.C. increment. It may be appreciated that the method of this last mentioned aspect of the present invention may be employed in combination with the methods of any of the previously described aspects.

Normally, in any of the above described methods of protecting, operation of the circuit breaker is delayed following initiating by a time dependent on the magnitude of the detected increase in negative sequence current. Further, where increases in negative susceptance are detected, the circuit breaker may be delayed following initiation by a time dependent on the magnitude of the detected increase in negative susceptance.

In a preferred example, said monitoring step comprises sampling selected parameters of the supply to the distributor cable to provide, for each of successive sampling periods, values for selected functions of said parameter including the negative and positive sequence currents, storing said values from successive sampling periods, and comparing said values for the latest sampling period with stored values of corresponding functions from a previous sampling period to detect increases in said values.

Alternatively, where only an increase in the negative susceptance value is being detected, the values of negative susceptance from successive sampling periods are stored and the value for the latest sampling period compared with stored values from previous sampling periods to detect increases.

Conveniently, a sampling period constitutes one cycle of the supply waveform and the instantaneous voltage and current of each phase are sampled at a sampling rate nF, where F is the supply frequency and n is an integer greater than 1, the values for said selected functions in each successive sampling period being determined by digitally filtering successive sets of n samples.

The present invention also envisages apparatus for remotely protecting three phase electricity supply distribution transformers, comprising means for monitoring parameters of the supply on a distributor cable to the transformers; control means responsive to the monitored parameters to detect an increase in at least one selected function of said parameters which can be indicative of a fault current flowing in the distributor cable, to analyse any such increase to determine the likely existence and magnitude of any such fault current, and to generate a trip signal in accordance with said analysis; and circuit breaker means responsive to said trip signal to isolate the supply cable; wherein said control means is operative to detect increases in the two functions, negative sequence current and positive sequence current, and to analyse these by comparing detected simultaneous increases in negative and positive sequence current and not initiating generation of said trip signal unless the detected negative sequence current increase exceeds a predetermined proportion of any detected simultaneous positive sequence current increase.

In a further aspect, the invention envisages apparatus having monitoring means, control means and circuit breaker means as aforesaid, and wherein said control means is operative to detect an increase in the transient D.C. current flowing in any respective phase in addition to an increase in at least one other selected function which can be indicative of a fault current, and to analyse these increases by discounting any detected increase in said other function or functions occuring for as long as a detected increase in D.C. current in any phase remains.

In a still further aspect the invention envisages apparatus having monitoring means, control means and circuit breaker means as aforesaid, and wherein said control means is operative to detect the two functions, negative sequence current and positive sequence current, and to analyse these by initiating generation of said trip signal in response to a detected increase in negative sequence current only if there is a simultaneous detected increase in positive sequence current in excess of a respective threshold increase.

In a yet further aspect, the invention envisages apparatus having monitoring means, control means and circuit breaker means as aforesaid, and wherein said control means is operative to provide from the monitored parameters time related values for the positive sequence current, voltage and phase angle, to calculate therefrom time related values for the susceptance of the distributor cable and load connected thereto, to detect increases in the function, negative susceptance, and to analyse this increase by initiating generation of the trip signal if said detected increase exceeds a predetermined threshold.

Conveniently in any of the above described apparatus, said control means may comprise digital computer means and said means for monitoring may comprise sampling and digitising means controlled by said computer means repeatedly to sample parameters of the supply and to digitise said samples for reading by the computer means. Then the computer means may be arranged and programmed to read said digitised parameter samples, to calculate therefrom a value for the or each said selected function in each of successive sampling periods, to store said successively calculated values, to compare the latest calculated value from the most recent sampling period with a stored value from a previous period to detect an increase in the value for the or each said function, to perform said analysis of any such increase or increases and to generate said trip signal accordingly.

Preferably, the sampling and digitising means is controlled to sample the instantaneous voltage and current in each of the phases of the supply and provide digitised samples of each of these parameters at a sampling rate nF, where F is the supply frequency and n is an integer greater than 1, and wherein the computer means is programmed to calculate a value for the or each said function in each successive cycle of the supply waveform by steps including digitally filtering successive sets of n samples of each parameter to eliminate the harmonic content of the waveform.

The digital filtering step may comprise Fourier analysis of the set of n samples to derive sine and cosine terms (A and B) for each parameter such that the amplitude V and phase $\phi$ of the respective parameter are represented:

$$\phi = \tan^{-1}(A/B)$$
$$V = k\sqrt{A^2 + B^2},$$

where k is a constant.

Very conveniently then, the computer means may be programmed to store at least the most recent n digitised samples of each parameter for use in performing said digital filtering step, and is further programmed to effect a selected phase shift of the derived sine and cosine terms of one parameter relative to the terms of another parameter by performing said Fourier analysis on different time rotated sets of n samples for the respective parameters from the stored samples.

BRIEF DESCRIPTION OF THE DRAWINGS

Examples of the present invention will now be described with reference to the accompanying drawings in which.

DESCRIPTION OF THE PREFERRED EMBODIMENT

Figure 1:
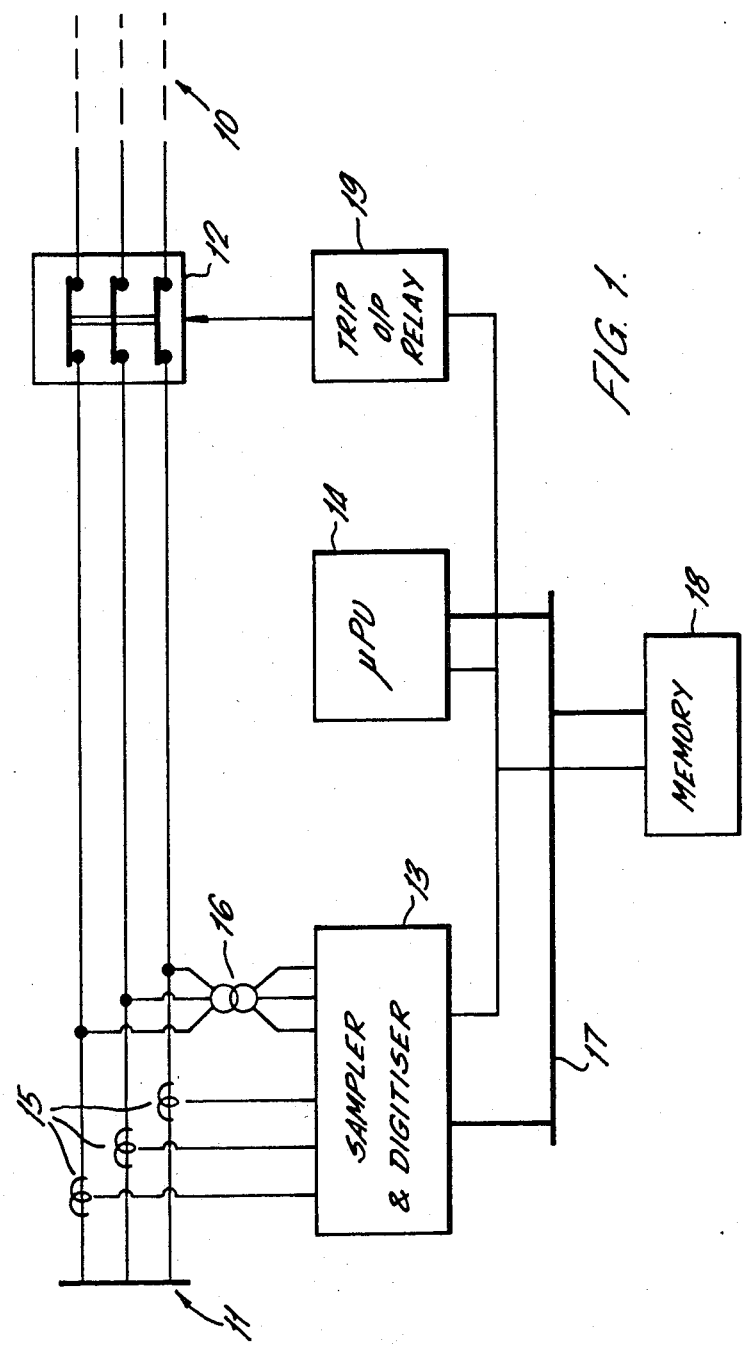
FIG. 1 is a block schematic diagram of microprocessor controlled apparatus for providing protection of an electricity supply distributor cable.

As shown in FIG. 1, the three phases of a distributor cable 10 are fed from a primary sub station 11 via a circuit breaker 12. A sampler and digitiser unit 13 is controlled by a microprocessor unit 14 to sample at a predetermined sampling rate the instantaneous current and voltage on each of the three phases, as sensed by repective current transformers 15 and voltage transformer 16. The sampled instantaneous values are digitised in the unit 13 for supply on the data bus 17 to the microprocessor 14 for storage in memory 18.

The microprocessor unit 14 is programmed to analyse the stored instantaneous voltage and current readings in accordance with algorithms which will be described in more detail later, so as to detect current and voltage conditions in the three phases of the distributor cable indicative of a fault condition arising on the load side of the circuit breaker. On detection of a fault condition, the microprocessor unit 14 is then further programmed to initiate a triggering procedure resulting in signalling a trip output relay 19 to operate the circuit breaker 12 to isolate the distributor cable 10 from the primary sub station 11.

The microprocessor unit 14 is controlled in accordance with a programme which may be held in part of the memory 18. The programme is divided into various tasks known as SAMPLE, FILTER, EVAL and PROTECTION.

Figure 2:
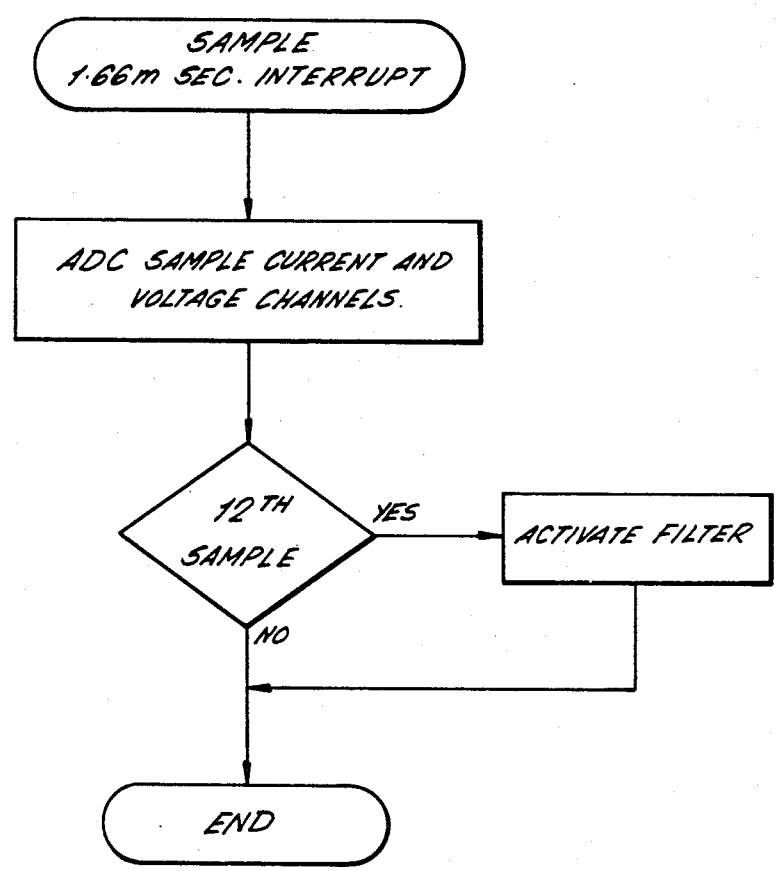
FIGS. 2 to 6 are flow charts illustrating the computer programme which is employed in the microprocessor of the apparatus of FIG. 1.

FIG. 2 is a flow chart of the SAMPLE task. The task is called by means of an interrupt signal in the computer every 1.66 mS. Each time the task is called, the computer controls the sampler and digitiser 13 to obtain fresh instantaneous samples of the current and voltage on each of the three phases and to digitise these samples. The microprocessor also then reads the digitised samples presented on the data bus 17 and stores these in locations of the memory 18. The microprocessor is then arranged to call the FILTER task following every twelfth execution of the SAMPLE task.

It can be seen therefore that the FILTER task is called every 20 mS, i.e. once per cycle of a 50 Hz supply waveform. On the other hand the voltage and current of the supply waveform are sampled 12 times per cycle.

Figure 3:
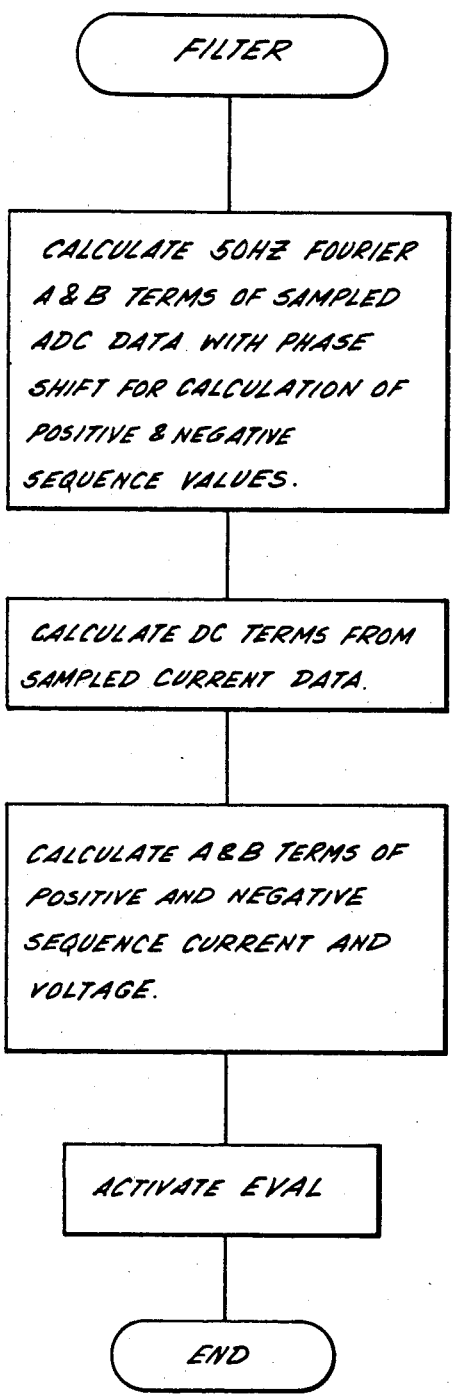

FIG. 3 is a flow chart of the FILTER task in the microprocessor programme. The filter task performs a Fourier analysis of a set of twelve successive samples for each of the measured parameters of voltage and current for each phase, so as to provide Fourier sine and cosine (A and B) terms for the fundamental frequency of each of these parameters. This Fourier analysis effectively filters out the higher harmonics which may be present in the voltage and current waveforms. Digital Fourier analysis techniques are well known for this purpose and, in the present case, the A and B terms of the 50 Hz fundamental for the voltage and current parameters are derived from the equations:

$$A = \left(\frac{1}{6}\right) \cdot \sum_{n=0}^{n=11} S_n \sin\left(\frac{n\pi}{6}\right)$$

$$B = \left(\frac{1}{6}\right) \sum_{n=0}^{n=11} S_n \cos\left(\frac{n\pi}{6}\right)$$

where $S_0$ to $S_{11}$ are the digitised sample values for each of the set of twelve samples used for the Fourier analysis of a particular parameter. The peak amplitude of the parameter is then represented by:

$$\overline{(A^2+B^2)}.$$

Similarly the phase angle of the parameter is represented by:

$$\text{Tan}^{-1}(A/B).$$

The microprocessor 14 is arranged to maintain in the memory 18 the most recent 48 samples for each of the monitored parameters of the three phase supply, thereby providing samples over the last four cycles of the supply waveform. When performing the Fourier analysis, or digital filtering, of the sets of twelve samples for each parameter, a phase shift between the various parameters is introduced by performing the Fourier analysis on different time shifted sets of twelve successive samples. For example, if the non phase-shifted red phase current $I_R$ is determined using red phase current samples $S_0$ to $S_{11}$, the yellow phase current with 120° phase shift is determined using yellow phase current samples $S_4$ through $S_{11}$ to $S_3$.

In order to calculate the positive and negative sequence components of current for the three phase supply, the computer is programmed to determine the Fourier A and B components of each of the following parameters:

$I_R$—red phase current (no shift)

$I_{Y120}$ and $I_{Y240}$—yellow phase current with 120° and 240° shifts $I_{B120}$ and $I_{B240}$—blue phase current with 120° and 240° shifts When determining voltage parameters of the three phases, a 30° phase shift is required to adjust for the phase to phase voltage transformer connections used in monitoring the voltage on the three phases of the cable.

Thus for determining positive and negative sequence components of voltage, the Fourier A and B terms are calculated of each of the following voltage parameters:

$V_{RY330}$—red-yellow voltage shifted by 330° (or −30°)

$V_{YB90}$ and $V_{YB210}$—yellow-blue voltage shifted by (120°−30°) and by (240°−30°)

$V_{BR90}$ and $V_{BR210}$—blue-red voltage shifted by (120°−30°) and by 240°−30°).

Having thus determined the A and B terms of each of the above parameters by the digital filtering or Fourier analysis technique described above, the A and B terms of the positive and negative sequence voltage and current values are then separately calculated from the following formalae in which the I and V terms indicated are taken to represent firstly the Fourier A term of the respective current or voltage parameter and then the Fourier B term of the respective parameter:

$$I_{pos}=(I_R+I_{Y120}+I_{B240})/3$$

$$V_{pos}=(V_{RY330}+V_{YB90}+V_{BR210})/3$$

$$I_{neg}=(I_R+I_{Y240}+I_{B120})/3$$

$$V_{neg}=(V_{RY330}+V_{YB210}+V_{BR90})/3.$$

In addition, the microprocessor is programmed to calculate the D.C. current in each phase by simply determining the sum of all twelve samples.

Once the programme has completed the FILTER task as outlined above, the EVAL task is activated.

Figure 4:
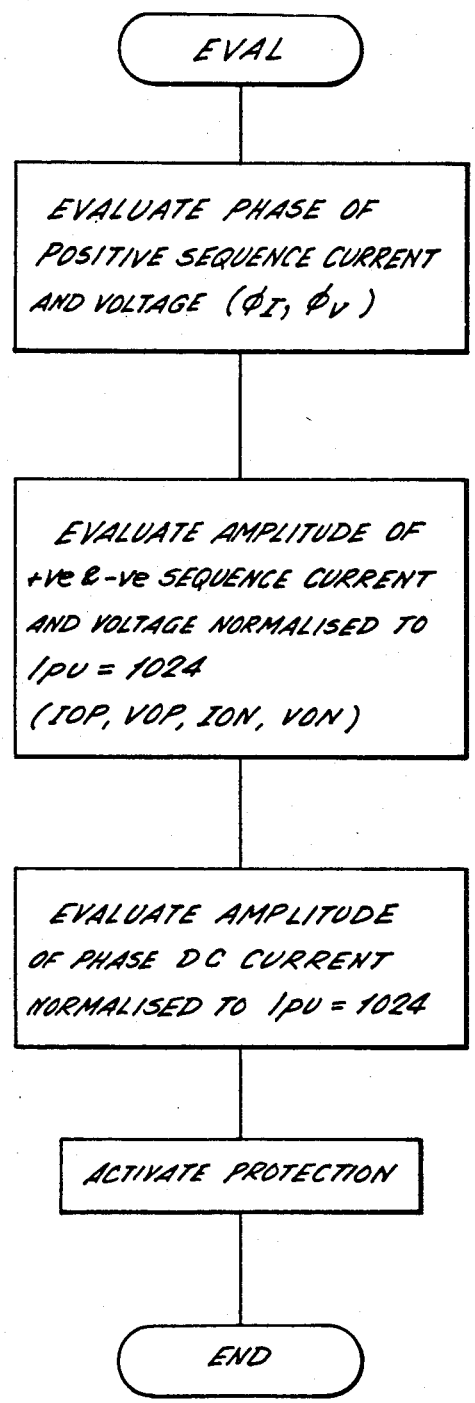

A flow chart of the EVAL task is illustrated in FIG. 4 of the accompanying drawings. The first step in the EVAL task is to evaluate the phase of the positive sequence current and voltage from the A and B terms derived by the FILTER task employing the formalae:

$$\phi=\text{Tan}^{-1}(A/B).$$

Next, the computer evaluates the amplitude of the positive and negative sequence current and voltage from the A and B terms for these parameters and normalises the evaluated amplitudes to a per-unit value equal to 1024 in binary.

The resulting evaluated phases of the positive sequence current and voltage will be referred to hereafter as $\phi_I$ and $\phi_V$, and the most recently evaluated normalised amplitudes of the positive and negative sequence current and voltage as IOP, VOP, ION, VON.

The EVAL task finally evaluates the amplitude of any detected D.C. current in each phase, again normalising the value to a per-unit of 1024.

On completing the EVAL task, the computer is programmed to start the PROTECTION task.

Figure 5:
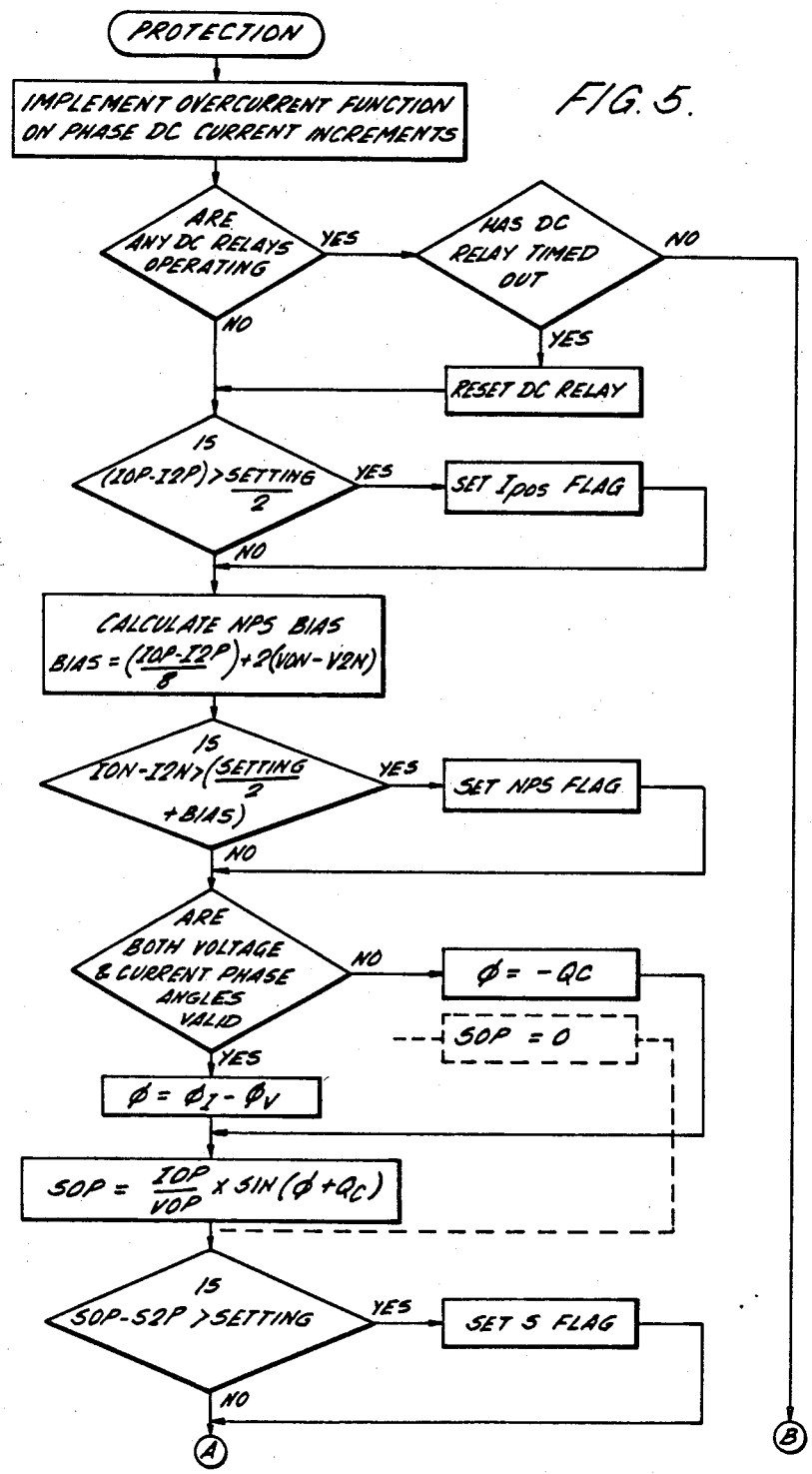
Figure 6:
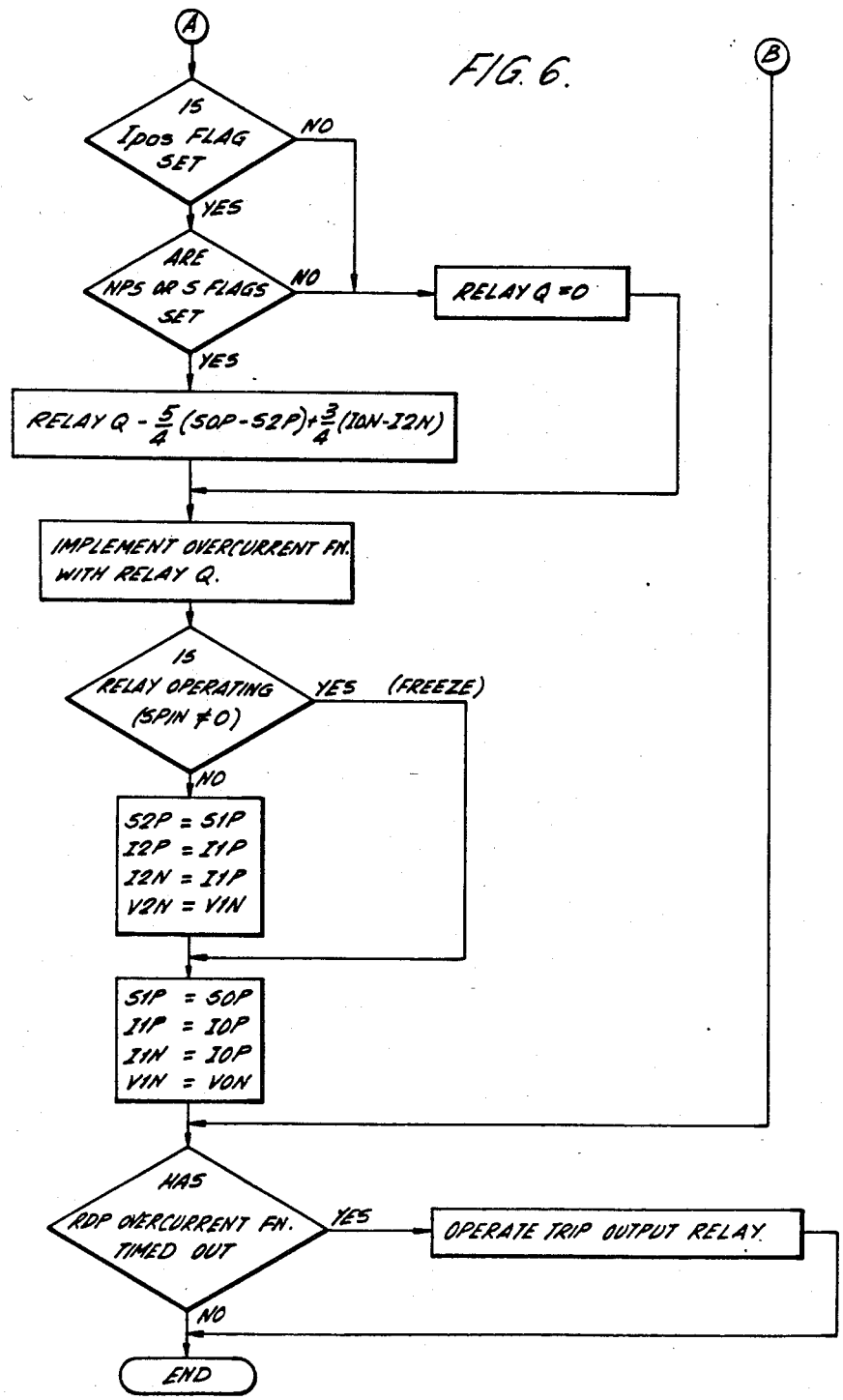

The PROTECTION task in the programme is illustrated in the flow chart on FIGS. 5 and 6.

The first function of the PROTECTION task is to check for any excessive increments in the detected D.C. current on any phase. This is done by the computer by checking the latest values for D.C. current as calculated in the immediately preceding EVAL task with corresponding values calculated on previous calls of the EVAL task following previous cycles of the supply waveform. Normally, the incremental detection is performed by comparing the latest calculated value with that calculated two cycles previously.

If a sudden increment in D.C. current in excess of a threshold is detected in any phase of the supply, the programme is arranged to skip all subsequent testing functions of the PROTECTION task, either until the D.C. current has returned to its previous level, or else until a certain time has elapsed following the sudden increase. The time delaying feature is embodied in the programme by use of a software function which mimics the operation of an induction disk relay, used in electricity distribution systems for providing a time delay between detection of a fault current and opening of a circuit breaker. The time delay is typically dependent on the detected size of the fault current (the relaying quanitity) and the setting designed to ensure that the operation of the circuit breaker is properly graded with the operation of other circuit breakers and fuses in the distribution circuit.

Accordingly the programme in the present example responds to detection of an excessive D.C. current increment in a particular phase by starting a counting process in a particular location of the memory and setting a flag to indicate that the respective "D.C. relay" is operating. The flag remains set either until the D.C. relay is halted when the D.C. current value reverts to the value before the increment, or else when the D.C. relay times out following a time delay determined inter alia by the size of the detected increment.

The programme is arranged to check to see if any of the D.C. relays are operating and not yet timed out and if so to skip all the remaining functions of the PROTECTION task as shown in the flow chart.

However, if none of the D.C. relays are operating, or else if a recently operating D.C. relay has now timed out, the PROTECTION function continues by performing the first check on the calculated values for positive and sequence voltage and current.

This first check is to look for a sudden increment in the positive sequence current. Thus, the latest calculated value for the positive sequence current (IOP) is compared with that calculated two cycles previously (I2P) to see if the difference between the two is greater than a preset threshold. If the difference is greater than the threshold, then the programme sets an $I_{pos}$ flag to indicate that a positive sequence current increment has been detected.

The next function of the PROTECTION task is to monitor the negative sequence current. For this purpose a bias value is first calculated comprising:

$$(IOP-I2P)/8+2\,(VON-V2N)$$

Then, the latest calculated value for negative sequence current is compared with that calculated two cycles previously and if the difference is greater than a preset threshold plus the previously calculated bias value, a NPS flag is set to indicate that a likely negative phase sequence fault has been detected.

It can be seen that the above referred bias includes a proportion of the detected increment in positive sequence current so that the NPS flag is not set unless the detected increase in negative sequence current exceeds the preset threshold plus this proportion of any simultaneous increase in positive sequence current. At the same time, the bias includes a factor times any simultaneous detected increase in negative sequence voltage. The purpose of these bias components will be described again in more detail later.

The next function in the PROTECTION task is to determine whether there is an excessive increase in the negative susceptance of the protected cable and load. For this purpose the programme first checks the calculated values for positive sequence voltage and current phase angle to ensure that these calculated values are valid. When the EVAL task is calculating the phases of the positive sequence voltage and current, it is unable to resolve the angle if the input quantity is too small, in which case the most significant bit of the word containing the phase angle is set. In the PROTECTION task, the programme first checks the most significant bits of the phase angle values to ensure none are set so that all the indicated values are to be considered valid. The programme then subtracts the phase of the positive sequence voltage from that of the positive sequence current to determine the phase angle $\phi$ and then calculates the positive sequence susceptance (SOP) from the formula:

$$SOP = \frac{IOP}{VOP} \times \sin(\phi + Q_C).$$

$Q_C$ is a compensation angle which represents the worst case load angle along which increments in normal fault free load should occur and for which no resultant sensitivity to susceptance increment is needed. A typical value for $Q_C$ is 15° so that a load at a lagging angle of 15° would then yield a calculated susceptance (SOP) of zero.

The programme makes any calculated positive values of SOP equal to zero and then negates any remaining values of SOP.

In the event that one or other of the calculated phase angles is considered invalid, the programme arranges for the calculated susceptance value SOP to be set to zero.

The most recent calculated susceptance value is then compared with that calculated two cycles previously (SOP−S2P) to see if the difference exceeds a predetermined threshold. It can be seen therefore that the difference SOP−S2P for a lagging fault condition resulting in an increase in negative susceptance, yields a positive value for comparison with the threshold.

If the detected increase in negative susceptance is above the threshold, an S flag is set indicative of a likely positive sequence fault condition.

The remaining functions of the PROTECTION task of the programme analyse the results of the various tests on changes in the positive and negative sequence current and negative susceptance to determine whether there is in fact a fault condition on the distributor cable and the estimated magnitude of the fault. If the $I_{pos}$ flag is set and also at least one of the NPS or S flags is set, a relaying quantity Q is determined according to the formula:

$$Q = 5/4 \, (SOP - S2P) + \tfrac{3}{4}(ION - I2N)$$

The relaying quantity Q so calculated is then used to set a time delaying relay function in the programme which again operates by imitating the operation of an induction disk relay. The higher is the calculated value of Q the shorter is the delay time produced by the relay before a signal is generated by the computer to operate the trip output relay 19 which in turn operates the circuit breaker 12.

If the $I_{pos}$ flag is not set, or else if neither of the NPS or S flags are set, then the relaying quantity Q is set at 0, so that the procedure for operating the circuit breaker 12 is not initiated.

Whilst the relay function in the programme is operating, i.e. the tripping of the circuit breaker has been initiated but the delay time has not yet timed out, the programme ensures that the previously used values S2P, I2P, I2N and V2N are frozen and not updated. This ensures that the next time the PROTECTION task is called, following the next cycle of the mains supply waveform, the latest measured and calculated values for SOP, IOP, ION, VON, are still compared with the previous reference values which are now the values from three cycles previously. This freeze condition continues until the programme determines that the time delaying relay is no longer operating.

This freezing operation ensures that the latest condition of the supply continues to be checked against that immediately preceding the fault condition. If the supply returns to within the threshold values immediately preceding the fault condition, the checks in the PROTECTION task will result in the various flags being reset so that the relaying quantity Q is set to zero, thereby inhibiting further operation of the delaying relay and causing it to reset before it has timed out.

In this way, a fault condition detected but not maintained for the delay time required to allow the delaying relay to time out, does not result in operation of the circuit breaker 12.

If the delaying relay is found not to be operating, i.e. Q has been set at zero, then the programme ensures that the value for S2P, I2P, I2N and V2N are updated with the values from the immediately preceding cycle S1P, I1P, I1N and V1N. Then the next time the PROTECTION task is called, following the next cycle of the supply waveform, the latest determined values for these functions will be compared once again with those from two cycles previously.

In all cases, whether the delaying relay is operating or not, the values S1P, I1P, I1N and V1N are updated before completion of the PROTECTION task to be set to the recently calculated values SOP, IOP, ION and VON.

The final check performed by the PROTECTION task is to determine whether the delaying relay, if set operating, has yet timed out. If it has, the computer provides a control signal to operate the trip output relay 19 so that the circuit breaker 12 is operated.

The determination of the relaying quantity Q in the above described part of the PROTECTION task is arranged to provide an evaluation of the magnitude of a fault condition which has been detected so as to ensure proper grading of the operating of the circuit breaker 12 with other circuit breaking elements which may be provided in the distributor circuit. Accordingly the factors employed in the above example as multipliers for the negative susceptance increment and the negative sequence current increment may be determined empirically to provide the required grading for the protection apparatus for various types of fault situation.

When the protection apparatus is programmed as described above, it is able to distinguish with a high degree of reliability between actual faults occuring on the distributor circuit and other parameter changes which are not normally indicative of a true fault. By use of incremental techniques, the settings at which various possible faults are indicated can be for actual fault currents which are significantly below the normal load current in the distributor cable. By biasing the setting for negative sequence current increments with a proportion of any simultaneous positive sequence current increment, the protection system can be rendered relatively insensitive to the substantial change in negative sequence current which can occur temporarily during the magnetising inrush current when energising a distribution transformer. By also biasing the setting for negative sequence current increments in accordance with simultaneously detected negative sequence voltage increments, the system can be made relatively insensitive to unbalanced disturbances on the source side of the protection apparatus.

By detecting increases in negative susceptance derived from the positive sequence current and voltage, true positive sequence faults can be detected at relatively low current levels compared to the normal load current.

What is claimed is:

1. A method of remotely protecting three phase electricity supply distribution transformers, including the steps of monitoring parameters of the supply on a distributor cable to the transformers to detect both increases in negative sequence current and increases in positive sequence current, comparing detected simultaneous increases in negative and positive sequence currents and initiating the triggering of a circuit breaker to isolate the supply cable in response to a detected increase in negative sequence current only if the negative sequence current increase exceeds a predetermined proportion of any simultaneous positive sequence current increase.

2. A method as claimed in claim 1, wherein the circuit breaker is triggered only if the negative sequence current increase exceeds a predetermined minimum threshold increase plus said predetermined proportion of any simultaneous positive sequence current increase.

3. A method as claimed in claim 2 wherein said predetermined proportion is selected to be greater than the maximum expected proportion of negative sequence to positive sequence current during energising of a fault-free distributor cable with connected load.

4. A method as claimed in claim 1 wherein supply parameters are monitored also to detect increases in negative sequence voltage and the circuit breaker is triggered only if the negative sequence current increase exceeds a predetermined factor times any simultaneous negative sequence voltage increase plus said predetermined minimum threshold increase plus said predetermined proportion of any simultaneous positive sequence current increase.

5. A method as claimed in claim 4 wherein said predetermined factor is selected to be greater than the modulus of the admittance of the distributor cable and connected load.

6. A method as claimed in claim 1 wherein said monitoring of parameters of the supply includes measuring parameters to provide time related values for the positive sequence current, voltage and phase angle, calculating therefore time related values for the susceptance of the distributor cable and load connected thereto, and monitoring said time related susceptance values to detect increases in negative susceptance, said circuit breaker being triggered additionally if said increase in negative susceptance exceeds a predetermined threshold increase.

7. A method as claimed in claim 6 wherein the time related susceptance values are calculated using the measured values for positive sequence phase angle biased by a predetermined compensation angle selected to produce zero monitored susceptance increase for normal fault-free increases in load current.

8. A method as claimed in claim 1 wherein increases in negative sequence current are detected which result from unbalanced disturbances on the cable, and said circuit breaker is not triggered unless there is a simultaneous detected increase in said positive sequence current in excess of a respective threshold increase.

9. A method as claimed in claim 1 wherein said monitoring of parameters of the supply includes detecting increases in transient D.C. current flowing in the respective phases, and said circuit breaker is not triggered in response to any increase or combination of increases occuring simultaneously with a detected increase in D.C. current in any phase for as long as the increase exceeds a predetermined threshold.

10. A method as claimed in claim 1 wherein operation of the circuit breaker is delayed following initiation by a time dependent on the magnitude of the detected increase in negative sequence current.

11. A method as claimed in claim 6 wherein operation of the circuit breaker is delayed following initiation by a time dependent on the magnitude of the detected increase in negative susceptance.

12. A method as claimed in claim 1, wherein said monitoring step comprises sampling selected parameters of the supply to the distributor cable to provide, for each of successive sampling periods, values for selected functions of said parameters including the negative and positive sequence currents, storing said values from successive sampling periods, and comparing said values for the latest sampling period with stored values of corresponding functions from a previous sampling period to detect increases in said values.

13. A method as claimed in claim 12 wherein a sampling period constitutes one cycle of the supply waveform and the instantaneous voltage and current of each phase are sampled at a sampling rate nF where F is the supply frequency and n is an integer greater than one, the values for said selected functions in each successive sampling period being determined by digitally filtering successive sets of n samples.

14. A method of remotely protecting three phase electricity supply distribution transformers, comprising the steps of monitoring parameters of the supply on a distributor cable to the transformers to detect increases in transient D.C. current flowing in the respective phases, and also to detect increases in other selected functions of said parameters for identifying and quantifying a fault current flowing in the distributor cable, analysing increases in said other selected functions to identify whether said increases indicate a fault current and to quantify any such fault current and initiating the triggering of a circuit breaker to isolate the supply cable on identifying a fault current, where said circuit breaker is not triggered for any increases in said other selected functions for as long as there is a detected increase in D.C. current in any phase.

15. A method of remotely protecting three phase electricity supply distribution transformers, comprising the steps of monitoring parameters of the supply on a distribution cable to the transformers to detect increases in positive sequence current and to detect increases in negative sequence current resulting from unbalanced disturbance on the cable, and initiating the triggering of a circuit breaker to isolate the supply cable in response to a detected increase in negative sequence current only if there is a simultaneous detected increase in the positive sequence current in excess of a respective threshold increase.

16. A method of remotely protecting three phase electricity supply distribution transformers, including the steps of measuring parameters of the supply on a distributor cable to the transformers to provide time related values for the positive sequence current, voltage and phase angle, calculating therefore time related values for the susceptance of the distributor cable and load connected thereto, monitoring said time related susceptance values to detect increases in negative susceptance, and initiating the triggering of a circuit breaker to isolate the supply cable if said increase exceeds a predetermined threshold increase.

17. A method as claimed in claim 16 wherein the time related susceptance values are calculated using the measured values for positive sequence phase angle biased by a predetermined compensation angle selected to produce zero monitored susceptance increase for normal fault-free increases in load current.

18. Apparatus for remotely protecting a three phase electricity supply distribution transformers, comprising means for monitoring parameters of the supply in a distributor cable to the transformers; control means responsive to the monitored parameters to detect an increase in at least one selected function of said parameters which can be indicative of a fault current flowing in the distributor cable, to analyse any such increase to determine the likely existance and magnitude of any such fault current, and to generate a trip signal in accordance with said analysis; and circuit breaker means responsive to said trip signal to isolate the supply cable; wherein said control means is operative to detect increases in the two functions, negative sequence current and positive sequence current, and to analyse these by comparing detected simultaneous increases in negative and positive sequence current and not initiating generation of said trip signal unless the detected negative sequence current increase exceeds a predetermined proportion of any detected simultaneous positive sequence current increase.

19. Apparatus for remotely protecting three phase electricity supply distribution transformers, comprising means for monitoring parameters of the supply in a distributor cable to the transformers; control means responsive to the monitored parameters to detect an increase in at least one selected function of said parameters which can be indicative of a fault current flowing in the distributor cable, to analyse any such increase to determine the likely existance and magnitude of any such fault current, and to generate a trip signal in accordance with said analysis; and circuit breaker means responsive to said trip signal to isolate the supply cable; wherein said control means is operative to detect an increase in the transient D.C. current flowing in any respective phase in addition to an increase in at least one other selected function which can be indicative of a fault current, and to analyse these increases by discounting any detected increase in said other function or functions occuring for as long as a detected increase in D.C. current in any phase remains.

20. Apparatus for remotely protecting three phase electricity supply distribution transformers, comprising means for monitoring parameters of the supply in a distributor cable to the transformers; control means responsive to the monitored parameters to detect an increase in at least one selected function of said parameters which can be indicative of a fault current flowing in the distributor cable, to analyse any such increase to determine the likely existance and magnitude of any such fault current, and to generate a trip signal in accordance with said analysis; and circuit breaker means responsive to said trip signal to isolate the supply cable; wherein said control means is operative to detect the two functions, negative sequence current and positive sequence current, and to analyse these by initiating generation of said trip signal in response to a detected increase in negative sequence current only if there is a simultaneous detected increase in positive sequence current in excess of a respective threshold increase.

21. Apparatus for remotely protecting three phase electricity supply distribution transformers, comprising means for monitoring parameters of the supply in a distributor cable to the transformers; control means responsive to the monitored parameters to detect an increase in at least one selected function of said parameters which can be indicative of a fault current flowing in the distributor cable, to analyse any such increase to determine the likely existance and magnitude of any such fault current, and to generate a trip signal in accordance with said analysis; and circuit breaker means responsive to said trip signal to isolate the supply cable; wherein said control means is operative to provide from the monitored parameters time related values for the positive sequence current, voltage and phase angle, to calculate therefrom time related values for the susceptance of the distributor cable and load connected thereto, to detect increases in the function, negative susceptance, and to analyse this increase by initiating generation of the trip signal if said detected increase exceeds a predetermined threshold.

22. Apparatus as claimed in any of claims 18 to 21 wherein said control means comprises digital computer means and said means for monitoring comprises sampling and digitising means controlled by said computer means repeatedly to sample parameters of the supply and to digitise said samples for reading by the computer means.

23. Apparatus as claimed in claim 22 wherein the computer means is arranged and programmed to read said digitised parameter samples, to calculate therefrom a value for the or each said selected function in each of successive sampling periods, to store said successively calculated values, to compare the latest calculated value from the most recent sampling period with a stored value from a previous period to detect an increase in the value for the or each said function, to perform said analysis of any such increase or increases and to generate said trip signal accordingly.

24. Apparatus as claimed in claim 23 wherein the sampling and digitising means is controlled to sample the instantaneous voltage and current in each of the phases of the supply and provide digitised samples of each of the parameters at a sampling rate nF where F is the supply frequency and n is an integer greater than one, and wherein the computer means is programmed to calculate a value for the or each said function in each successive cycle of the supply waveform by steps including digitally filtering successive sets of n samples of each parameter to eliminate the harmonic content of the waveform.

25. Apparatus as claimed in claim 24 wherein the digital filtering step comprises Fourier analysis of the set of n samples to derive sine and cosine terms (A and B) for each parameter such that the amplitude V and phase $\phi$ of the respective parameter are represented:

$$\phi = \tan^{-1}(A/B)$$

$$V = k\sqrt{A^2 + B^2},$$

where k is a constant

26. Apparatus as claimed in claim 25 wherein the computer means is programmed to store at least the most recent n digitised samples of each parameter for use in performing said digital filtering step, and is further programmed to effect a selected phase shift of the derived sine and cosine terms of one parameter relative to the terms of another parameter by performing said Fourier analysis on different time rotated sets of n samples for the respective parameters from the stored samples.

* * * * *